United States Patent
Hurkat et al.

(10) Patent No.: US 11,243,778 B1
(45) Date of Patent: Feb. 8, 2022

(54) INSTRUCTION DISPATCH FOR SUPERSCALAR PROCESSORS

(71) Applicant: Microsoft Technology Licensing, LLC, Redmond, WA (US)

(72) Inventors: Skand Hurkat, Bellevue, WA (US); Jeremy Fowers, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/139,425

(22) Filed: Dec. 31, 2020

(51) Int. Cl.
*G06F 9/38* (2018.01)
*G06F 9/30* (2018.01)

(52) U.S. Cl.
CPC ........ *G06F 9/3887* (2013.01); *G06F 9/30036* (2013.01); *G06F 9/3814* (2013.01); *G06F 9/3836* (2013.01); *G06F 9/3851* (2013.01); *G06F 9/3857* (2013.01)

(58) Field of Classification Search
CPC .... G06F 9/3887; G06F 9/3836; G06F 9/3851; G06F 9/3857
See application file for complete search history.

(56) References Cited

U.S. PATENT DOCUMENTS

| 5,539,911 | A | * | 7/1996 | Nguyen | ................ | G06F 9/3013 712/23 |
| 2016/0224513 | A1 | * | 8/2016 | Moudgill | ............ | G06F 9/30112 |

* cited by examiner

*Primary Examiner* — Jyoti Mehta

(57) ABSTRACT

The present disclosure relates to instruction dispatch mechanisms for superscalar processors having a plurality of functional units for executing operations simultaneously. Each particular functional unit of the plurality of functional units may be configured to output a capability vector indicating a set of operations that the particular functional unit is currently available to perform. As instructions are received in an issue queue, the functional unit to execute the instruction is selected by comparing capabilities required by the instruction to the asserted capabilities of each of the functional units. A functional unit may reset or de-assert a particular functionality while performing an operation and then re-assert the capability when the instruction is completed. A result of the operation may be stored in a skid buffer for at least as long as the chain execution time in order to avoid resource hazards are a write port of the vector register file.

20 Claims, 5 Drawing Sheets

INSTRUCTION DISPATCH FOR SUPERSCALAR PROCESSORS

BACKGROUND

The present disclosure relates to computing and more particularly to instruction dispatch mechanisms for superscalar processors with multiple functional pipelines. Superscalar processors are computer processor that implement instruction parallelism such that more than one instruction may be executed simultaneously during a single clock cycle by different functional units (e.g., execution units) of the processor. Superscalar processors may also implement temporal single-instruction-multiple-data (SIMD) processing techniques such that one instruction may executed with different data (e.g., vector data) over multiple clock cycles.

Certain hazards may arise when issuing instructions in a pipeline, which can potentially lead to an incorrect result. Such hazards include data hazards, which may occur when instructions having data dependencies modify data in different stages of a pipeline (e.g., one instruction reads a source before another instruction has written to it—a read after write hazard), and structural (or resource) hazards which may occur when two or more instructions that are already in pipeline need the same resource (e.g., two instruction attempt to write to the same register during the same clock cycle).

Accordingly, there is a need to issue instructions only when they are guaranteed access to the register file write port. This may be achieved using a reservation station technique where each instruction reserves the write port for the cycle when it is expected to finish executing. However, the reservation station technique requires scanning through a list of the preceding instructions to detect read and write port conflicts. Such scanning may be difficult for superscalar processors implemented using a field programmable gate array (FPGA) without content-addressable memories (CAMs). While hazards may be avoided without content-addressable memory using other techniques (e.g., re-order buffers or another associative structure), such techniques may not inherently allow the number of functional units to be scaled.

The present disclosure pertains to instruction dispatch mechanisms for superscalar processors that do not require content addressable memory or other associative structures and that provide decentralized control which allows the number of functional units to be scaled. Additional advantages are described in the detailed description below.

SUMMARY

Embodiments of the present disclosure perform instruction dispatch for superscalar processors with multiple functional pipelines.

One embodiment provides a computer system that includes a non-transitory computer readable storage medium having stored thereon a plurality of instructions. The computer system may also include a plurality of functional units for executing operations simultaneously. Each particular functional unit of the plurality of functional units may be configured to output a capability vector indicating a set of operations that the particular functional unit is currently available to perform. The computer system may also include a control unit configured to issue the plurality of instructions to the plurality of functional units based on operation capabilities required by the plurality of instructions and based on the plurality of capability vectors.

Another embodiment provides a method for issuing a plurality of instructions on a superscalar vector processor. The method includes obtaining a plurality of capability vectors from a plurality of functional units of the superscalar vector processor. Each particular functional unit of the plurality of functional units may be configured to output a capability vector indicating a set of operations that the particular functional unit is currently available to perform. The method may also include issuing the plurality of instructions to the plurality of functional units based on operation capabilities required by the plurality of instructions and the plurality of capability vectors.

Another embodiments provides a non-transitory computer readable storage medium having stored thereon program code executable by a computer system. The program code may cause the computer system to obtain a plurality of capability vectors from a plurality of functional units of the superscalar vector processor. Each particular functional unit of the plurality of functional units may be configured to output a capability vector indicating a set of operations that the particular functional unit is currently available to perform. The program code may further cause the computer system to issue a plurality of instructions to the plurality of functional units based on operation capabilities required by the plurality of instructions and the plurality of capability vectors.

BRIEF DESCRIPTION OF THE DRAWINGS

Various embodiments of the present disclosure are illustrated by way of example and not limitation in the figures of the accompanying drawings.

DETAILED DESCRIPTION

Figure 1:
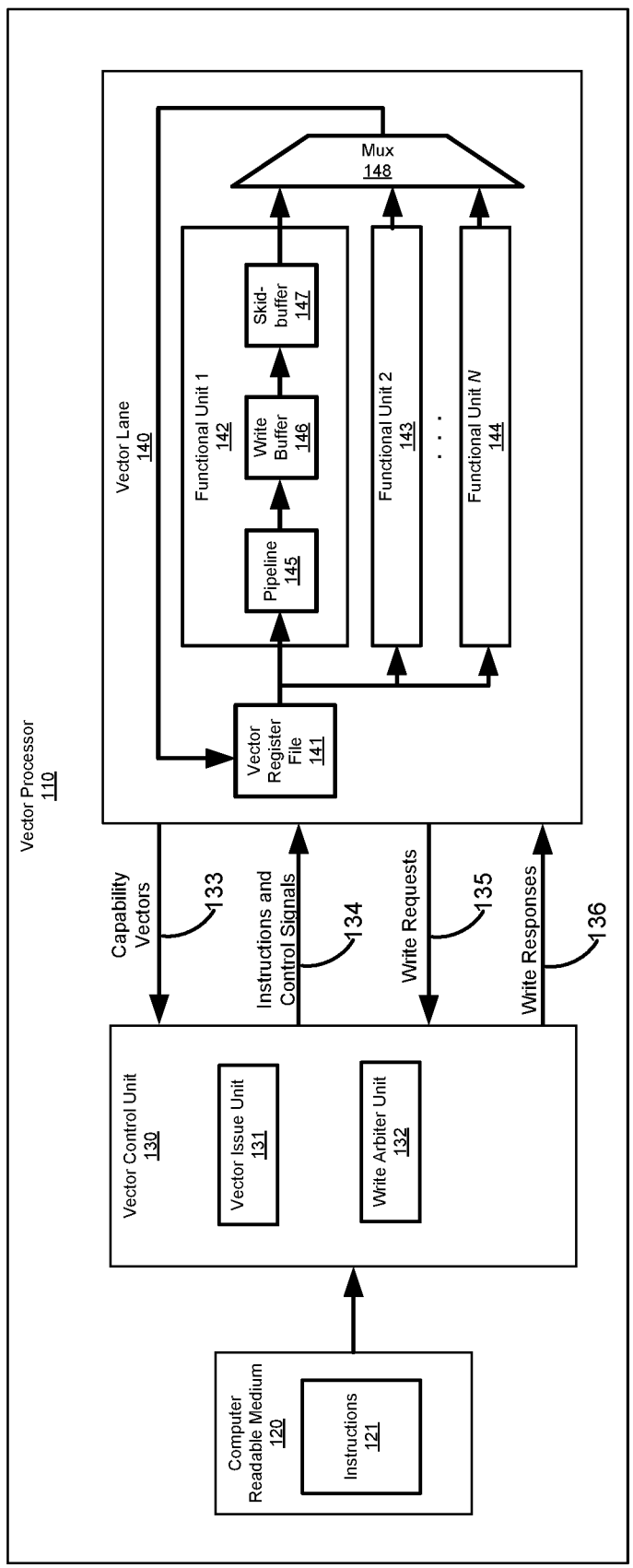
FIG. 1 shows a diagram of a vector processor, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

As mentioned above, superscalar processors are computer processor that implement instruction parallelism such that more than one instruction may be executed simultaneously during a single clock cycle by different functional units (e.g., execution units) of the processor. Superscalar processors may also implement temporal single-instruction-multiple-data (SIMD) processing techniques such that one instruction may executed with different data (e.g., vector data) over multiple clock cycles.

Certain hazards may arise when issuing instructions in a pipeline, which can potentially lead to an incorrect result. Such hazards include data hazards, which may occur when instructions having data dependencies modify data in different stages of a pipeline (e.g., one instruction reads a source before another instruction has written to it—a read after write hazard), and structural (or resource) hazards which may occur when two or more instructions that are already in pipeline need the same resource (e.g., two instruction attempt to write to the same register during the same clock cycle).

Accordingly, there is a need to issue instructions only when they are guaranteed access to the register file write port. This may be achieved using a reservation station technique where each instruction reserves the write port for the cycle when it is expected to finish executing. However, the reservation station technique requires scanning through a list of the preceding instructions to detect read and write port conflicts. Such scanning may be difficult for superscalar processors implemented using a field programmable gate array (FPGA) without content-addressable memories (CAMs). While hazards may be avoided without content-addressable memory using other techniques (e.g., re-order buffers or another associative structure), such techniques may not inherently allow the number of functional units to be scaled.

The present disclosure pertains to instruction dispatch mechanisms for superscalar (temporal single-instruction-multiple-data) processors with multiple functional pipelines that do not require content addressable memory or other associative structures and that provide decentralized control which allows the number of functional units to be scaled. The instruction dispatch techniques described herein allows the functional pipelines to be swapped in different implementations of the processor at design time such that each implementation may be optimized for a certain subset of workloads.

The instruction dispatch technique requires each functional pipeline to assert a set of "capabilities" (e.g., as a capability vector), which indicate the subtypes of operations that the pipelines are capable of processing (e.g., add, multiply, compare, load, store, etc.). Each instruction may be tagged with the capability it requires. As further described below, the dispatch mechanism may determine whether a pipeline with the capability required by an instruction is available using the asserted capabilities (e.g., capability vector) of the functional units, and dispatch the instruction to the given functional unit. When the functional unit is issued the instruction, and it is unable to accept a subset of instructions, it may change its capability in the capability vector for that subset. For example, a functional unit capable of performing an add may change its capability vector to indicate that it is not currently able to perform an add operation when it receives an add instruction. When the add instruction completes, that functional unit may change its capability vector to indicate that it is currently able to perform an add such that it may then be issued an add instruction.

The functional units may assert more than one capability. For example, a functional unit may be capable or performing an add operation, a subtract operation, a load operation, and a store operation. The dispatch mechanism may be agnostic to the capabilities asserted by any one functional unit provided that the total set of capabilities asserted by all functional units covers the set of capabilities required by all instructions supported by the processor.

This technique for issuing instructions is advantageous because a designer may swap, at design time, the set of functional units to create different superscalar processors for different use cases (e.g., different product part numbers). Furthermore, this technique may not require reservation stations, reorder buffers, or any form of content addressable memory lookups, thereby making it advantageous for use with field programmable gate arrays (FPGAs), which may have a fixed number of resources not including content addressable memory. This technique for issuing instructions may be useful when each instruction occupies a functional unit over multiple cycles, as instructions must still be issued one every cycle, such as in temporal SIMD processors, where one instruction is executed with different data over multiple cycles. The technique for issuing instructions is further described below.

FIG. 1 shows a diagram of a vector processor 110, according to an embodiment. In some embodiments, the vector processor may be implemented by a field-programmable gate array without content addressable memory. The vector processor 110 may include a computer readable medium 120 comprising a plurality of instructions 121. The instructions may be vector instructions operating on vector data, which may also be stored in the computer readable medium 120. The computer readable medium may comprise a register file, random access memory (RAM), or read only memory (ROM) for example.

The vector processor 110 also includes a vector control unit 130 for issuing instructions and control signals 134 to one or more vector lanes. The vector control unit 130 may be configured to issue the plurality of instructions to the plurality of functional units based on operation capabilities required by the plurality of instructions and the plurality of capability vectors as further described below. The vector control unit 130 includes a vector issue unit 131 and a write arbiter unit 132. The vector processor 110 also includes the one or more vector lanes including a first vector lane 140 and any other vector lanes (not shown in FIG. 1). The vector lane 140 includes a vector register file 141 and a plurality of functional units, including a first functional unit 142, a second functional unit 143, and an nth functional unit 144. FIG. 1 includes ellipsis between the second functional unit 143 and the nth functional unit 144 to indicate that a different number of functional units may be used in different embodiments. The functional units operate on vector data. The vector processor 100 may use a temporal single-instruction multiple data paradigm such that every instruction of the plurality of instructions processes distinct elements of the vector data over multiple clock cycles.

The different functional units may be configured to perform different operations, such as add, multiply, compare, load, store, etc. These functional units may perform operations simultaneously with each other. The plurality of functional units may provide capability vectors 133 to the vector control unit 130. Each particular functional unit of the plurality of functional units may be configured to output a capability vector 133 indicating a set of operations that the particular functional unit is currently available to perform. The different capability vectors from the different functional units may assert one than one capability, and the different functional units may have different capabilities. Each of the plurality of functional units changes its output capability vector when issued an operation and when completing the operation.

The first functional unit 142 includes an execution pipeline 145 for executing an instruction over several clock cycles, a write buffer 146 for storing the result of the pipeline 145 operations, and a skidbuffer storage 147 configured to store an output of that functional unit (e.g., the output from the pipeline 145 as stored in the write buffer 146) for a fixed number of clock cycles. The plurality of functional units may be pipelined with a pipeline initiation interval that is the fixed number (N) of clock cycles. This number (N) may be referred to as "chime," or chain execution time. Each particular functional unit of the plurality of functional units may require access to a write port of the register file 141 once during the fixed number of clock cycles. The number of the plurality of functional units may be less than or equal to the fixed number (N) and the skidbuffer 147 may be configured to store the output of the pipeline 145 for the fixed number (N) of cycles in order to prevent resource hazards when writing to the vector register file 141. The second functional unit 143 and the nth functional unit 144 may be configured similar to the first functional unit 142 except that they be capable of performing different operations.

The write arbiter unit 132 of the vector control unit may be configured to obtain write requests 135 (from the functional units) to write to the write port of the vector register file 141. The write arbiter unit 132 may be configured to grant access to the write port of the vector register file 141 by cycling through the plurality of functional units at least every fixed number (N) of clock cycles. The write arbiter unit 132 may control the write operation by controlling the multiplexer 148, which receives the output of each skidbuffer of the functional units and outputs one of those to the vector register file 141. As further described below, the write arbiter unit 132 may uses a priority encoder with a round-robin settable priority such that structural hazards on the write port hazards are resolved.

In some embodiments, the write requests 135 are not generated by the vector lane 140 and are instead generated by the vector control unit 130 using a functional model of the vector lane 140. The functional model of the vector lane may simulate the timing behavior of the functional units. In some implementations, the functional model may simulate the timing behavior of the functional units without implementing the arithmetic capability of the functional units. The vector control unit may use the functional model to determine when to issue write requests since the control signals of the vector lanes may be a delayed version of the signals in the control unit.

Accordingly, the vector processor 110 may prevent resource hazards when writing to the vector register file 141 using the skidbuffers and the write arbiter unit 132 described above. And such hazards may be avoided without the use of content addressable memory, thereby enabling this technique to be used in computer systems without content addressable memory, such as certain field programmable gate arrays. Furthermore, the configuration of the write arbiter unit 132 provides decentralized control which allows the number of functional units to be scaled at design time.

Figure 2:
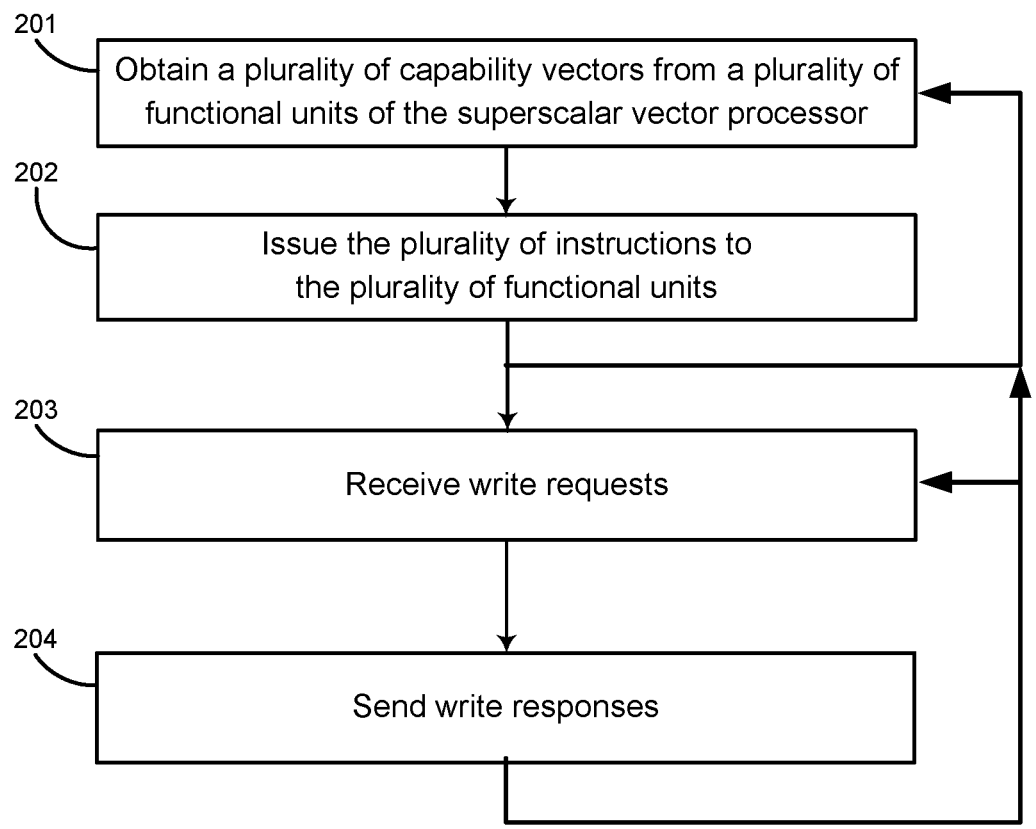
FIG. 2 shows a diagram of a process for dispatching instructions on a vector processor, according to an embodiment.

FIG. 2 shows a diagram of a process for dispatching instructions on a vector processor, according to an embodiment. The process may be implemented by the vector control unit 130 described above with respect to FIG. 1.

At 201, the vector control unit obtains a plurality of capability vectors from a plurality of functional units of a superscalar vector processor. Each particular functional unit of the plurality of functional units may be configured to output a capability vector indicating a set of operations that the particular functional unit is currently available to perform.

At 202, the vector control unit issues the plurality of instructions to the plurality of functional units based on operation capabilities required by the plurality of instructions and the plurality of capability vectors. Each instruction may be tagged with the one or more capabilities that it requires. The instructions may be issued over a fixed number of cycles (chime of N) as discussed above. After issuing the instruction at 202, the vector control unit may obtain the next instruction that has been fetched and decoded and return to step 201.

At 203, the vector control unit may receive write requests from one or more of the functional units. They functional units may send write requests after having completed an operation. The results of the operation may be stored in a skidbuffer of the functional unit as described above. The skidbuffer may maintain the results for N cycles (the chime) while the next instruction is being executed and is writing to a write buffer. That is, the skidbuffer stores the output of the write buffer for N cycles so that instructions may continue to be executed while resource hazards are resolved with respect to a vector register file.

At 204, the vector control unit may send write responses to the functional units, one write response to one functional unit per cycle. The vector control unit may determine which functional unit may store its skidbuffer to the vector register file using a round-robin technique based on a priority encoder. The priority for a particular functional unit may be reset when it is given access to write (e.g., an affirmative write response) such that each functional unit is given access to write to the vector register file at least once every N cycles (the chime). Advantageously, the above techniques allow for resource hazards involving the vector register file to be avoided in a scalable manner and without the use of content addressable memory.

As shown in FIG. 2, the instruction issue process is continuous in that instructions are obtained, a functional unit to perform the instruction is selected based on the capability vectors, and the instruction is issued, with writing of the instruction result being handled to avoid resource hazards and ensure that each functional unit may store the result of its instruction.

Figure 3:
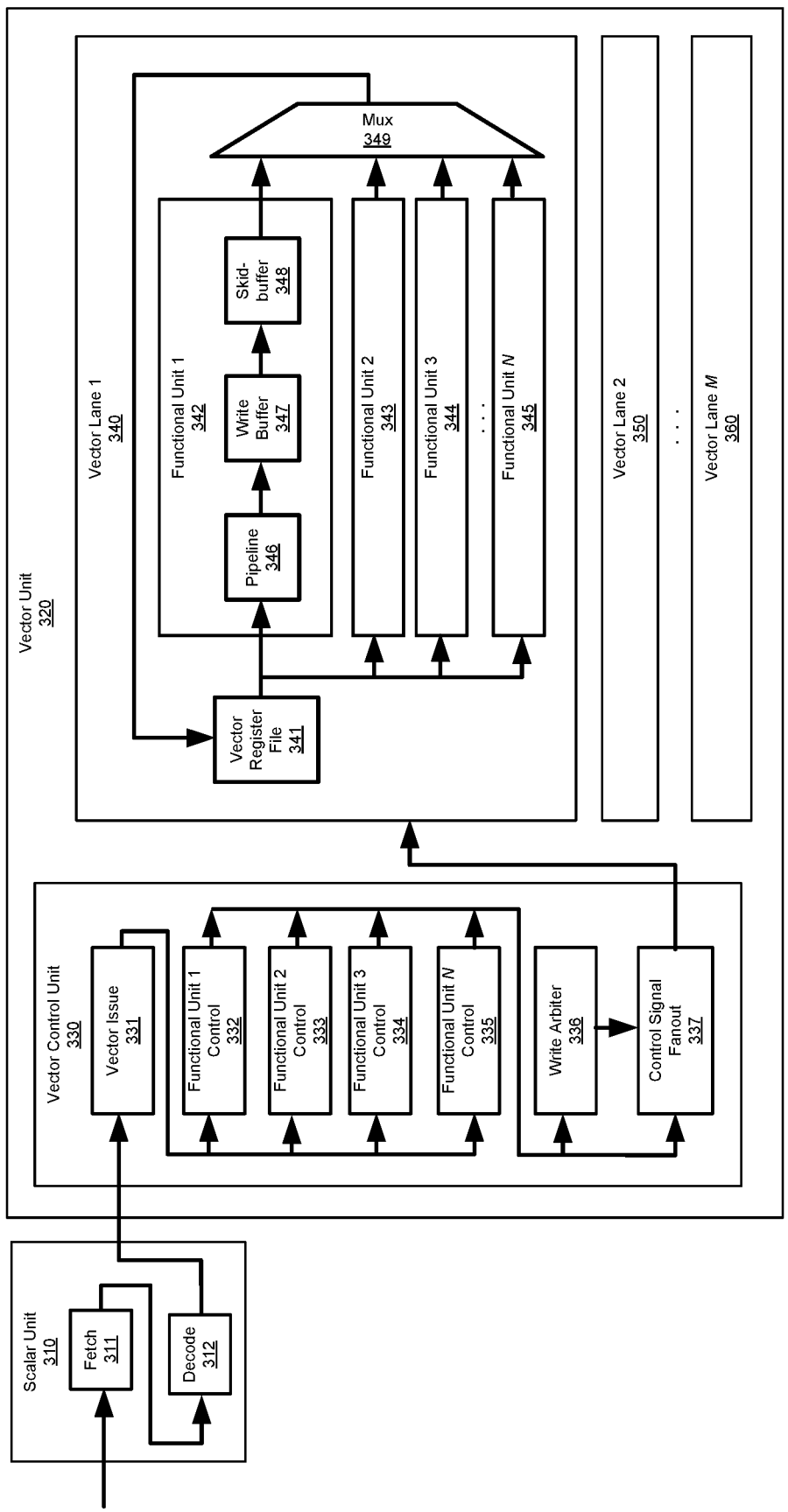
FIG. 3 shows a diagram of, a scalar unit, a vector control unit, and vector lanes, according to an embodiment.

FIGS. 1 and 2 above describe techniques for issuing instructions in a vector processor. Further details of such vector processors are described below with respect to FIG. 3. The components and configurations of FIG. 3 may be implemented in the vector processor 110 of FIG. 1 and in the process described with respect to FIG. 2. FIG. 3 shows a diagram of a scalar unit 310 and a vector control unit 330 and vector lanes 340, 350, 360 of a vector unit 320, according to an embodiment. The vector processor 110 of FIG. 1 may implement the components and functionalities of the vector unit 320 described below with respect to FIG. 3.

The scalar unit 310 performed fetching 311 of instructions, decoding 312 of those instructions, and forwarding vector instructions to the vector unit 320 for execution. The decoded instructions from the decode unit 312 of the scalar unit 310 may be provided to the vector issue unit 331, of the vector control unit 330, of the vector unit 320. The vector unit 320 comprises the vector control unit 330 and multiple vector lanes 340, 350, 360. Ellipsis are used between the second vector lane 350 and the mth vector lane 360 to indicate that the number of functional units may be different in different embodiments. The vector lanes 340, 350, 360 may have a feed-forward design.

The vector control unit 330 includes a vector issue unit 331, a first functional unit control 332 for controlling the first functional unit 342, a second functional control unit 333 for controlling the second functional unit 343, a third functional control unit 333 for controlling the third functional unit 345, and an nth functional control unit 335 for controlling the nth functional unit 345. Control signals from these control units may be provided to a write arbiter 336, which may be configured similar to the write arbiter 132 described above with respect to FIG. 1, and to a control signal fanout 337, which may provide the control signals to the various vector lanes and functional units.

Control signals from the vector control unit 330 (i.e., from a control signal fanout 337) drive the vector lanes to complete the necessary vector operations. Each of the vector lanes 340, 350, 360 include a plurality of functional units, which may perform one operation, or a set of related operations. The first vector lane 340 includes a first functional unit 342, a second functional unit 343, a third functional unit 344, and an nth functional unit 345. Ellipsis are used between the third functional unit 344 and the nth functional unit 345 to indicate that the number of functional units may be different in different embodiments. The first functional unit 342 includes an execution pipeline 346, a write buffer 347, and a skidbuffer 348, which may be configured similar to the corresponding elements described above with respect to FIG. 1. The other functional units 343, 344, 345 may be configured similar to the first functional unit 342 except that they may be capable of performing different operations. The results of the functional units (e.g., the result stored in the skidbuffers) may be provided to a multiplexer (mux) 349 which may be controlled by control signals from the vector control unit 330 (e.g., the control signal fanout 337). Based on the control signals, the multiplexer may provide the result from one functional unit to be written to the vector register file as described above with respect to FIG. 1. The vector unit 320 may achieve spatial SIMD by fanning out control to all lanes using the control signal fanout 337.

The vector unit 320 may implement temporal and spatial SIMD (single-instruction multiple data) paradigms. The multiple vector lanes 340, 350, 360 achieve the spatial SIMD paradigm, wherein the same instruction processes multiple data elements using distinct datapaths. The temporal SIMD paradigm is achieved by requiring every instruction to process distinct elements of the vector over multiple clock cycles. The length of time over which an instruction is processed is referred to as "chime" (chain execution time). While an instruction is executing for the vector chime, other independent instructions may be issued to other functional units that are idle. This allows superscalar execution in the vector unit, as multiple instructions are executing simultaneously.

In some embodiments, vector data may be striped across the vector lanes 340, 350, 350, such that each vector lane holds a distinct subset of vector elements. The vector register file in each lane (e.g., register file 341 in the first vector lane 340) may be configured to hold "chime" (referred to as N herein) elements, such that one element is processed ever cycle. Each functional unit within a vector lane (e.g., a functional unit capable of add, multiply, compare, load, and/or store operations, etc.) may read all N values from the register file (e.g., register file 341) in a single cycle, and may multiplex these values one at a time through a pipelined datapath that can process a single element every cycle (e.g., pipeline 346). In some embodiments, the latency of the pipeline need not be one cycle, but the initiation interval may be one cycle. Latency refers to the time (in number of clock cycles) from data being supplied at the input of a pipeline to the data being available at the output of a pipeline, while initiation interval refers to the number of cycles that must elapse before two distinct pieces of data are inserted in a pipeline.

In some embodiments, the vector register file may have two read and one write (2R1W) port, or one read and one write (1R1W) port. In case of a 1R1W register file, each functional unit may accept two operands over two cycles, whereas with a 2R1W register file, the two operands may be supplied in the same cycle. In some embodiments, 2R1W memory may achieved by replicating data across two 1R1W memories available in an FPGA.

Temporal SIMD may be achieved in the vector processor by reading a wide chunk of data (e.g., N elements wide) and sending the data to the functional unit over N cycles. While a functional unit is thus occupied in this manner, another functional unit may accept an instruction with different data.

For example, consider a vector unit with 16 lanes and where the chime is 8 (N=8) within the lane. In this example, each lane has a 32-bit datapath and the data is striped across the lanes such that the first lane (lane 0) has vector elements 0-7, the second lane (lane 1) has elements 8-15, and so on. In this embodiment, each element is a 32-bit quantity. When the vector unit process an instruction such as a vector-add with source registers 5 and 6, and destination register 7, the vector processor may perform the following operations on the read port:

1. Set read addresses 5 and 6 on the read ports the register file and latch the data in the functional unit that can perform an add operation.

2. Select the first element of data and send it to the add pipeline.

3. In the next cycle, select the next element, and continue until all (N=8) elements in that lane are processed. Since all lanes perform the same operation in parallel, the entire vector will be processed in N=8 cycles.

On the write side, when the first result is available, the vector processor may perform the following operations on the write port:

1. Write the result in the first entry of the write buffer ("gearbox").

2. On the next cycle, write the second entry, and continue until all (N=8) entries have been written 3. Copy over the data in the 8-wide (N=8) gearbox register into the 8-wide skidbuffer. At this point, the gearbox register may accept the results of the next instruction (if there is a next instruction), and data can reside in the skidbuffer for the next N=8 cycles until the functional unit is granted access to the register file write port by the write port arbiter, as discussed above.

4. When the write port arbiter grants access, write to register 7 in the vector register file.

Since a functional unit may read from the register file in one cycle, and it may write to the register file in one cycle, but it may process data in N cycles, then N different functional units may be able to operate simultaneously on different instructions with different data. This allows the vector processor to achieve superscalar execution using temporal SIMD. These techniques also allow for resource hazards involving the vector register file to be avoided in a scalable manner and without the use of content addressable memory.

As described above with respect to FIG. 1-3, a vector control unit may control the issuing of instructions to vector lanes and functional units. In some embodiments, the vector control unit may be implemented in a temporal SIMD processor on an FPGA with a vector register file composed of 1R1W memories. In such embodiments, as the vector register file consists of only one read and write port, the vector control unit 400 must arbitrate the read and write ports on these memories between multiple functional units in order to avoid resource hazards. One method to avoid hazards is to configure the vector control unit to issue instructions only when they are guaranteed access to the register file write port. As discussed above, this may be achieved using a reservation station, where each instruction reserves the write port for the cycle when it is expected to finish executing. However, the reservation station technique requires scanning through a list of preceding instructions to detect read and write port conflicts, which may be difficult for FPGAs without content-addressable memories. However, resource hazards may be avoided without using a reservation station, and without using content addressable memory, through the use of a vector control unit including a write arbiter and functional units including skidbuffers as described above. Further details of such vector control units are further described below.

Figure 4:
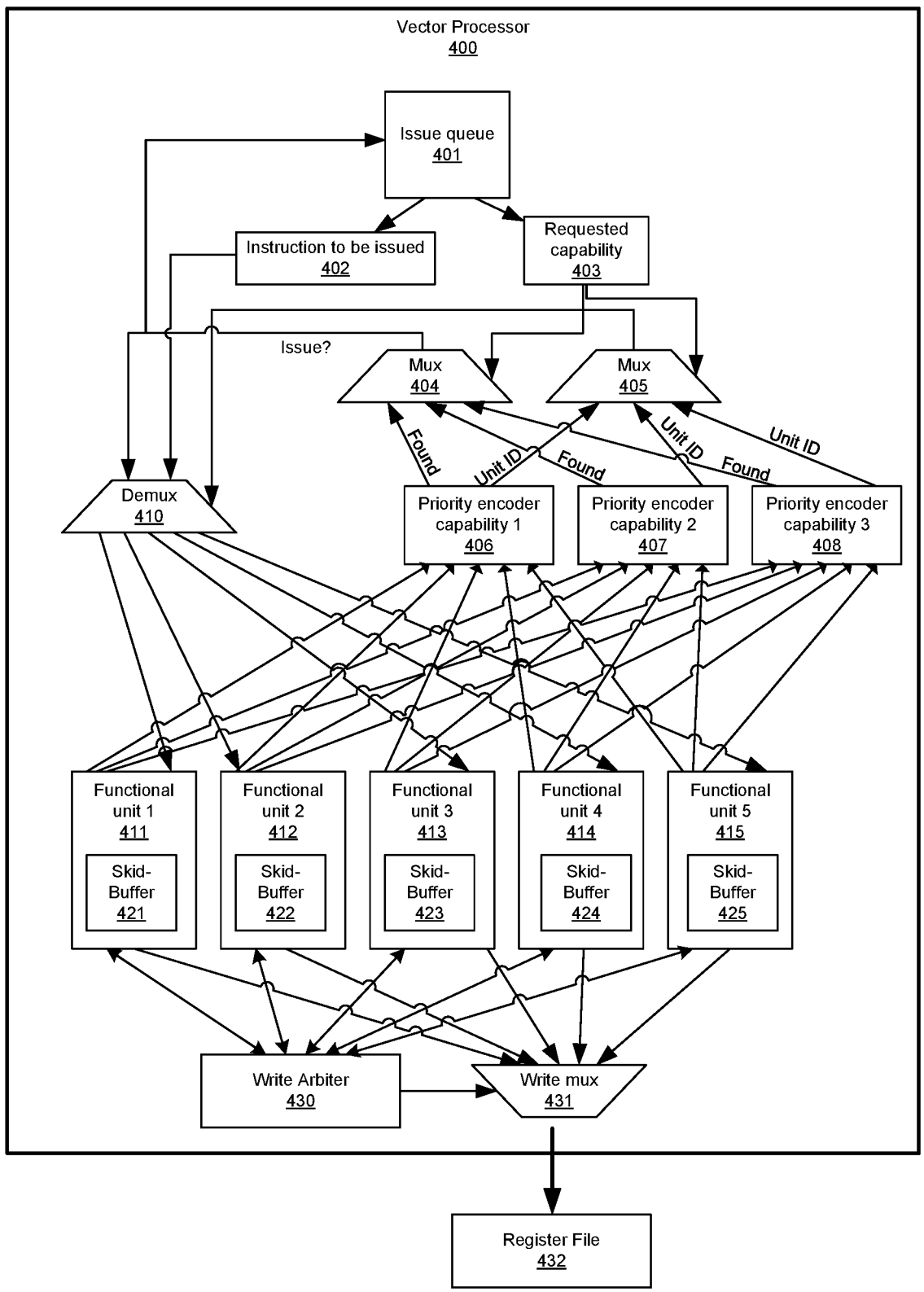
FIG. 4 shows a diagram of a vector processor, according to an embodiment.

FIG. 4 shows a diagram of a vector processor 400, according to an embodiment. In some embodiments, the logic shown in FIG. 4 may be implemented in the vector control units described above. In some embodiments, a temporal SIMD processor may consist of multiple functional units 411, 412, 413, 414, 415 that all perform operations on data over a fixed number of cycles (N, the vector chime). Each functional unit 411, 412, 413, 414, 415 may be pipelined, with an N cycle pipeline initiation interval as discussed above. In other words, once a functional unit begins operation on a set of vector operands, it will remain unavailable for N cycles. During this time, other functional units may accept operands and execute operations. Therefore, each functional unit 411, 412, 413, 414, 415 requires access to the write port of the register file 432 once every N cycles. Access to the register file 432 may be provided while avoiding resource hazards by using the techniques described below.

The vector control unit 400, obtains instructions in order, which fill up an issue queue 401. The instructions may be pulled one at a time from the issue queue 401 and analyzed to identify the "capability" they request. Each instruction may be tagged with the capabilities that it requires. The capabilities may be identified based on such tags.

Each functional unit 411, 412, 413, 414, 415 may assert one or more capabilities depending on the subset of instructions they are ready to receive. The capabilities may be asserts as a capability vector as discussed above. Each bit in the capability vector may be associated with a particular capability and it may be set (e.g., to 1) if the functional unit is currently capable of performing operations requiring that capability. The functional units may de-asserted (e.g., set to 0) these capabilities either one at a time, or all at once when the functional unit is busy. The capabilities may be reasserted after an operation is completed.

In some embodiments, these capability vectors are output to a set of priority encoders 406, 407, 408, including a first priority encoder 406 for a first capability, a second priority encoder 407 for a second capability, and a third priority encoder 408 for a third capability. There may be one priority encoder for each capability supported by the system. In this example, the instructions require one of three different capabilities and so three priority encodes are used.

As an instruction is obtained from the issue queue 401, the requested capability 403 is determined a Unit ID of the functional unit having the highest priority that is ready to receive the instruction (if any are ready) is obtained from the priority encoder associated with the capability requested by that instruction. In some embodiments, priority may merely be used for selection purposes. Each of the priority encoders 406, 407, 408 output both a "found" indicator (e.g., "1" if a functional unit providing the capability is available) and the Unit ID (e.g., "00" for the first functional unit 411, "01" for the second functional unit 412, and so on). The "found" identifiers may be provided to a first multiplexer 404 and the Unit IDs may be provided to a second multiplexer 405. The requested capability 403 of the instruction from the issue queue 401 may be used to control these two multiplexers 404, 405 in order to determine whether the capability is found by the first multiplexer 404 and to determine the Unit ID of the functional unit that has the capability available by the second multiplexer 405. The found indicators input to the first multiplexer 404 may be used to output an "issue?" signal from the first multiplexer 404 that indicates whether or not the instructions should be issued. The "issue?" signal may be provided to a demultiplexer 410 and to the issue queue 401 such that these logical blocks may determine whether the issue the next instruction in the queue or not. The Unit ID output from the second multiplexer 405 may be provided to the demultiplexer 410. The "issue?" signal and the Unit ID may be used to control the demultiplexer 410 such that the "instruction to be issued" 402 is provided to the functional unit corresponding to the Unit ID when the "issue?" signal indicates that the instruction should be issued. An exemplary algorithm for determining the Unit ID is provided:

```
forever {
  capability←compute_capability(instruction)
  do {
    (unit_available, unit_id)←query_priority_encoder(capability)
  } while(not unit_available)
  issue(unit_id, instruction)
}
```

When the functional unit receives the instruction from the demultiplexer 410, it may de-assert its capability vector for either that specific instruction type, or all instruction types. The functional unit may read (not represented by an arrow in FIG. 4) its source data over one or two cycles from the register file 432. Since this instruction is may be the only one accessing the register file 432, the instruction is, by construction, guaranteed access to the read port of the register file 432. Accordingly, the instruction proceeds through the functional unit (e.g., through its pipeline) and the result of the instruction is stored in the functional unit's skidbuffer 421, 422, 423, 424, or 425. The skidbuffer is a temporary storage area that may hold the output of the functional unit for at least N cycles (where N is the chime) without a later instruction overwriting it.

While the data is in a skidbuffer 421, 422, 423, 424, or 425, the corresponding functional unit may assert a request for the write port to the write port arbiter 430, as discussed above. In some embodiments, the write arbiter 430 may use a round-robin approach to grant accesses. In some embodiments, it may use a priority encoder with a round-robin settable priority to minimize the amount of time that the data remains in the skidbuffer. An exemplary priority based algorithm is provided below:

```
initial {
  last_served=0;
}
```

```
forever {
if(any(requests)) {
    serving←get_priority(input=requests,
        lowest_priority=last_served)
    grant(serving)←1
    serve(serving)
    grant(serving)←0
    last_served=serving
}
}
```

Given this write arbitration algorithm, the data will remain in the skidbuffer for less than F (the number of functional units) cycles, as the write arbiter 430 cycles through the functional units 411, 412, 413, 414, 415. If F≤N (i.e., the number of functional units is less than or equal to the chime), this algorithm guarantees that data in the skidbuffer will not be overwritten. Advantageously, the result of the instruction may be written to the register file 432 while avoid resource hazards on the write port of the register file 432, and without requiring content addressable memory. Instead of a conventional approach that uses a reservation station with content addressable memory to reserve resources that would otherwise be a structural hazard, the techniques described above with respect to FIG. 4 allows the functional units to stall and operate asynchronously and reactively.

Further features and advantages of this technique is that it is capable of scaling with the number of functional units and the number of capabilities required by the functions. Adding a new capability to the instruction set simply involves adding yet another priority encoder to the design, while adding a new functional unit simply increases the number of inputs on the priority encoders designated for the capabilities supplied by that unit.

Figure 5:
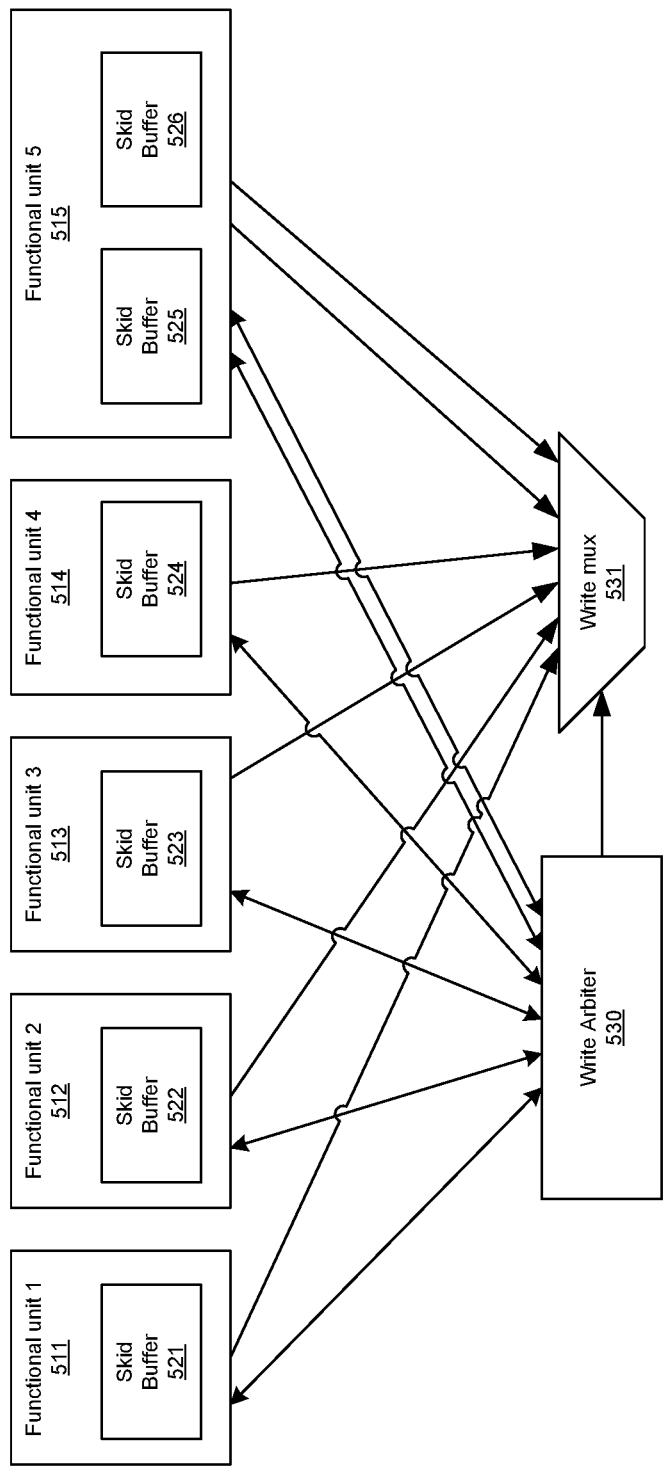
FIG. 5 shows a diagram of a vector lane including a functional unit that operates at twice the speed of the other functional units, according to an embodiment.

The techniques for issuing instructions and writing the results of instructions may also be implemented in different configurations. FIG. 5 shows a diagram of a vector lane including a functional unit that operates at twice the speed of the other functional units, according to an embodiment. The elements shown in FIG. 5 may be configured similar to the corresponding elements discussed above with respect to FIG. 4 except as described below. In particular, the fifth functional unit 515 is configured to operate at twice the speed of the other functional units 511, 512, 513, 514. As such, the fifth functional unit may have half the initiation interval (i.e., N/2) compared to the other functional units. Such a configuration may be accommodated by using two skidbuffers 525, 256 in the fifth functional unit 515, and providing the output of the fifth functional unit 515 to the write arbiter 530 and the write multiplexer 531 as if it were two separate functional units. Internally, the fifth functional unit 515 may perform a round-robin cycle through its two skidbuffers 525, 526 to ensure that each skidbuffer is overwritten after no less than N cycles.

An example of dispatching instructions in a vector processor according to the techniques described is provided below. In this example, the vector processor may execute multiply, add, subtract, load, and store instructions. Accordingly, it may have the following functional units:
1. Load-store
2. Multiply
3. Add-subtract Therefore, the set of capabilities required are:
1. Load
2. Store
3. Multiply
4. Add/subtract In this example, each functional unit outputs a 4-bit capability vector with bits corresponding to the 4 capabilities listed above. In this example, there are five functional units and the capabilities of those functional units are as follows:
Functional Unit 1: Add/subtract
Functional Unit 2: Add/subtract
Functional Unit 3: Multiply
Functional Unit 4: Multiply
Functional Unit 5: Load-store In this example, functional unit 1 and functional unit 2 will output a 4 bit capability vector that may be 0001 or 0000 since the list of capabilities is load, store, multiply, and add/subtract as listed above. The capability vector may be 0001 (currently available to perform add/subtract operations) or 0000 (not available to perform add/subtract operations) depending on whether these functional units are busy executing an instruction or not. Similarly, functional unit 3 and functional unit 4, capable of performing the multiply operation, will output capability vectors of either 0010 or 0000, as multiply is the third capability in the list above. Since functional unit 5 may execute a load or a store operation, its capability vector output may be 1000, 0100, 1100, or 0000, depending on whether it is ready to receive a load instruction, a store instruction, both, or none.

In this example, three add or subtract instructions may arrive in a row (e.g., in the issue queue). If all functional units are ready to receive instructions, then all of the functional units may assert their respective capabilities. Since the first instruction is an add, the issue unit may query the priority encoder for the add/subtract capability (Capability 4). In this example, functional unit 1 has the lowest priority and it is available. So functional unit 1 will receive the instruction. While functional unit 1 is processing the instruction, it will reset (de-assert) its add/subtract capability to 0 (e.g., its capability vector may be 0000).

The second instruction is a subtract operation and requests the add/subtract capability. Accordingly, the issue unit may query the same priority encoder (Capability 4). Since functional unit 1 is busy, the priority encoder will return the next available unit that can perform add/subtract operations, which in this example is functional unit 2. The issue unit may then send the instruction to functional unit 2 and functional unit 2 may will reset its add/subtract capability until it is ready to accept the next instruction (e.g., its capability vector may be 0000).

The next instruction is an add, requesting add/subtract capabilities. In this case, the issue unit will again query the Capacity 4 priority encoder and identify that no functional units capable of accepting an add/subtract instruction are currently available. The instruction will, therefore, stall in the issue stage until a functional unit with the add/subtract capability is available, which will be N cycles after functional unit 1 accepted the first instruction.

After M cycles (e.g., the latency or pipeline depth), the data processed by functional unit 1 will be available in its skidbuffer. At this point, functional unit 1 will request the write port from the write arbiter, which will eventually grant it access to the write port. Then the data will be written back to the register file and the instruction will complete. Assuming that instruction 3 was consumed by functional unit 1, its data will be available in functional unit 1's skidbuffer at N+M cycles, which satisfies the N-cycle time between service guarantee for the write arbiter, thereby ensuring that the output is stored while avoiding resource hazards at the write port as discussed above.

FURTHER EXAMPLE EMBODIMENTS

In various embodiments, the present disclosure includes systems, methods, and apparatuses for issuing instructions on a superscalar processor.

One embodiment provides a computer system that includes a non-transitory computer readable storage medium having stored thereon a plurality of instructions. The computer system may also include a plurality of functional units for executing operations simultaneously. Each particular functional unit of the plurality of functional units may be configured to output a capability vector indicating a set of operations that the particular functional unit is currently available to perform. The computer system may also include a control unit configured to issue the plurality of instructions to the plurality of functional units based on operation capabilities required by the plurality of instructions and based on the plurality of capability vectors.

In some embodiments, each of the plurality of functional units comprise a skidbuffer storage configured to store an output of that functional unit for a fixed number of clock cycles. In such embodiments, the plurality of functional units may be pipelined with a pipeline initiation interval that is the fixed number of clock cycles and each particular functional unit of the plurality of functional units may require access to a write port of a register file once during the fixed number of clock cycles.

In some embodiments, the computer system may include a write arbiter unit configured to obtain requests to write to the write port from the plurality of functional units. The write arbiter unit may also be configured to grant access to the write port by cycling through the plurality of functional units at least every fixed number of clock cycles. In some embodiments, a number of the plurality of functional units may be less than or equal to the fixed number. In some embodiments, the write arbiter unit may use a priority encoder with a round-robin settable priority such that structural hazards on the write port hazards are resolved.

In some embodiments, the control unit comprises a functional model that simulates timing behavior of the plurality of functional units. In such embodiments, the control unit may generate requests to write to the write port based on the simulated timing behavior of the plurality of functional units In some embodiments, each of the plurality of functional units may change its output capability vector when issued an operation and when completing the operation.

In some embodiments, the functional units may operate on vector data and the computer system uses a temporal single-instruction multiple data paradigm such that every instruction of the plurality of instructions processes distinct elements of the vector data over multiple clock cycles.

In some embodiments, the computer system is a field-programmable gate array without content addressable memory.

Another embodiment provides a method for issuing a plurality of instructions on a superscalar vector processor. The method includes obtaining a plurality of capability vectors from a plurality of functional units of the superscalar vector processor. Each particular functional unit of the plurality of functional units may be configured to output a capability vector indicating a set of operations that the particular functional unit is currently available to perform. The method may also include issuing the plurality of instructions to the plurality of functional units based on operation capabilities required by the plurality of instructions and the plurality of capability vectors.

In some embodiments, each of the plurality of functional units comprises a skidbuffer storage configured to store an output of that functional unit for a fixed number of clock cycles. In such embodiments, the plurality of functional units may be pipelined with a pipeline initiation interval that is the fixed number of clock cycles and each particular functional unit of the plurality of functional units requiring access to a write port of a register file once during the fixed number of clock cycles.

In some embodiments, the method also includes obtaining requests to write to the write port from the plurality of functional units and granting access to the write port by cycling through the plurality of functional units at least every fixed number of clock cycles.

In some embodiments, a number of the plurality of functional units is less than or equal to the fixed number.

In some embodiments, the granting of access to the write port uses a priority encoder with a round-robin settable priority such that structural hazards on the write port hazards are resolved.

In some embodiments, each of the plurality of functional units changes its output capability vector when issued an operation and when completing the operation.

In some embodiments, the functional units operate on vector data and the computer system uses a temporal single-instruction multiple data paradigm such that every instruction of the plurality of instructions processes distinct elements of the vector data over multiple clock cycles.

In some embodiments, the computer system is a field-programmable gate array without content addressable memory.

Another embodiments provides a non-transitory computer readable storage medium having stored thereon program code executable by a computer system. The program code may cause the computer system to obtain a plurality of capability vectors from a plurality of functional units of the superscalar vector processor. Each particular functional unit of the plurality of functional units may be configured to output a capability vector indicating a set of operations that the particular functional unit is currently available to perform. The program code may further cause the computer system to issue a plurality of instructions to the plurality of functional units based on operation capabilities required by the plurality of instructions and the plurality of capability vectors.

In some embodiments, each of the plurality of functional units comprise a skidbuffer storage configured to store an output of that functional unit for a fixed number of clock cycles. The plurality of functional units may be pipelined with a pipeline initiation interval that is the fixed number of clock cycles and each particular functional unit of the plurality of functional units requiring access to a write port of a register file once during the fixed number of clock cycles.

In some embodiments, the program code may further cause the computer system to obtain requests to write to the write port from the plurality of functional units and grant access to the write port by cycling through the plurality of functional units at least every fixed number of clock cycles.

In some embodiments, a number of the plurality of functional units is less than or equal to the fixed number.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system comprising:
a non-transitory computer readable storage medium having stored thereon a plurality of instructions;
a plurality of functional units for executing operations simultaneously, each particular functional unit of the plurality of functional units configured to output a capability vector indicating a set of operations that the particular functional unit is currently available to perform; and
a control circuit configured to obtain a plurality of capability vectors from the plurality of functional units and issue the plurality of instructions to the plurality of functional units based on operation capabilities required by the plurality of instructions and the plurality of capability vectors.

2. The computer system of claim 1, wherein each of the plurality of functional units comprise a skidbuffer storage configured to store an output of that functional unit for a fixed number of clock cycles, wherein the plurality of functional units are pipelined with a pipeline initiation interval that is the fixed number of clock cycles, each particular functional unit of the plurality of functional units requiring access to a write port of a register file once during the fixed number of clock cycles.

3. The computer system of claim 2, further comprising a write arbiter circuit configured to obtain requests to write to the write port from the plurality of functional units and grant access to the write port by cycling through the plurality of functional units at least every fixed number of clock cycles.

4. The computer system of claim 3, wherein a number of the plurality of functional units is less than or equal to the fixed number.

5. The computer system of claim 3, wherein the write arbiter circuit uses a priority encoder with a round-robin settable priority.

6. The computer system of claim 1, wherein the control circuit simulates timing behavior of the plurality of functional units, and the control circuit generates requests to write to a write port based on the simulated timing behavior of the plurality of functional units.

7. The computer system of claim 1, wherein each of the plurality of functional units changes its output capability vector when issued an operation and when completing the operation.

8. The computer system of claim 1, wherein the functional units operate on vector data and the computer system uses a temporal single-instruction multiple data paradigm such that execution of every instruction of the plurality of instructions processes distinct elements of the vector data over multiple clock cycles.

9. The computer system of claim 1, wherein the computer system is a field-programmable gate array without content addressable memory.

10. A method for issuing a plurality of instructions on a superscalar vector processor, comprising:
obtaining a plurality of capability vectors from a plurality of functional units of the superscalar vector processor, each particular functional unit of the plurality of functional units configured to output a capability vector indicating a set of operations that the particular functional unit is currently available to perform; and
issuing the plurality of instructions to the plurality of functional units based on operation capabilities required by the plurality of instructions and the plurality of capability vectors.

11. The method of claim 10, wherein each of the plurality of functional units comprise a skidbuffer storage configured to store an output of that functional unit for a fixed number of clock cycles, wherein the plurality of functional units are pipelined with a pipeline initiation interval that is the fixed number of clock cycles, each particular functional unit of the plurality of functional units requiring access to a write port of a register file once during the fixed number of clock cycles.

12. The method of claim 11, further comprising:
obtaining requests to write to the write port from the plurality of functional units; and
granting access to the write port by cycling through the plurality of functional units at least every fixed number of clock cycles.

13. The method of claim 12, wherein a number of the plurality of functional units is less than or equal to the fixed number.

14. The method of claim 12, wherein the granting of access to the write port uses a priority encoder with a round-robin settable priority.

15. The method of claim 10, wherein each of the plurality of functional units changes its output capability vector when issued an operation and when completing the operation.

16. The method of claim 10, wherein the functional units operate on vector data and the superscalar vector processor uses a temporal single-instruction multiple data paradigm such that execution of every instruction of the plurality of instructions processes distinct elements of the vector data over multiple clock cycles.

17. The method of claim 10, wherein the superscalar vector processor is a field-programmable gate array without content addressable memory.

18. A non-transitory computer readable storage medium having stored thereon program code executable by a computer system, the program code causing the computer system to:
obtain a plurality of capability vectors from a plurality of functional units of the computer system, each particular functional unit of the plurality of functional units configured to output a capability vector indicating a set of operations that the particular functional unit is currently available to perform; and
issue a plurality of instructions to the plurality of functional units based on operation capabilities required by the plurality of instructions and the plurality of capability vectors.

19. The non-transitory computer readable storage medium of claim 18, wherein each of the plurality of functional units comprise a skidbuffer storage configured to store an output of that functional unit for a fixed number of clock cycles, wherein the plurality of functional units are pipelined with a pipeline initiation interval that is the fixed number of clock cycles, each particular functional unit of the plurality of functional units requiring access to a write port of a register file once during the fixed number of clock cycles.

20. The non-transitory computer readable storage medium of claim 19, wherein the program code further causes the computer system to:
obtain requests to write to the write port from the plurality of functional units; and grant access to the write port by cycling through the plurality of functional units at least every fixed number of clock cycles.

\* \* \* \* \*